United States Patent
Kim et al.

(10) Patent No.: US 8,320,534 B2
(45) Date of Patent: Nov. 27, 2012

(54) METHOD AND SYSTEM FOR ESTABLISHING CONNECTION TO CALLED TERMINAL

(75) Inventors: Kunsik Kim, Incheon (KR); Doohyoung Lee, Seoul (KR); Hyukjae Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 937 days.

(21) Appl. No.: 12/398,607

(22) Filed: Mar. 5, 2009

(65) Prior Publication Data
US 2009/0225960 A1 Sep. 10, 2009

(30) Foreign Application Priority Data
Mar. 5, 2008 (KR) .................. 10-2008-0020451

(51) Int. Cl.
- H04M 11/00 (2006.01)
- H04L 12/56 (2006.01)
- H04N 7/14 (2006.01)
- G06F 15/16 (2006.01)

(52) U.S. Cl. ............ 379/88.13; 370/352; 370/356; 370/395.21; 370/401; 379/142.01; 379/202.01; 379/207.16; 455/414.1; 455/445; 709/231; 713/162

(58) Field of Classification Search ............ 370/352, 370/356, 395.21, 401; 379/88.13, 142.01, 379/207.16, 202.01; 455/414.1, 445; 709/231; 713/162
See application file for complete search history.

(56) References Cited

U.S. PATENT DOCUMENTS

| | | | | |
|---|---|---|---|---|
| 5,615,266 | A * | 3/1997 | Altschuler et al. | 713/162 |
| 7,215,663 | B1 * | 5/2007 | Radulovic | 370/356 |
| 7,242,943 | B2 * | 7/2007 | Rasanen | 455/445 |
| 7,460,518 | B1 * | 12/2008 | Salama et al. | 370/352 |
| 7,693,134 | B2 * | 4/2010 | Batni et al. | 370/352 |
| 7,885,266 | B2 * | 2/2011 | Rengaraju et al. | 370/395.21 |
| 8,068,593 | B2 * | 11/2011 | Batni et al. | 379/207.16 |
| 2006/0147010 | A1 * | 7/2006 | Batni et al. | 379/202.01 |
| 2007/0177616 | A1 * | 8/2007 | Jabri et al. | 370/401 |
| 2007/0180135 | A1 * | 8/2007 | Kenrick et al. | 709/231 |
| 2007/0189474 | A1 * | 8/2007 | Cai | 379/142.01 |
| 2007/0206576 | A1 * | 9/2007 | Radulovic | 370/352 |
| 2007/0207782 | A1 * | 9/2007 | Tran | 455/414.1 |
| 2009/0161854 | A1 * | 6/2009 | Ku et al. | 379/207.16 |
| 2009/0225960 | A1 * | 9/2009 | Kim et al. | 379/88.13 |
| 2011/0129079 | A1 * | 6/2011 | Simonds | 379/207.16 |
| 2011/0150203 | A1 * | 6/2011 | Stille et al. | 379/207.16 |

FOREIGN PATENT DOCUMENTS

| | | |
|---|---|---|
| KR | 2004-102493 | 12/2004 |
| KR | 2006-62659 | 6/2006 |
| KR | 2007-49384 | 5/2007 |
| KR | 2007-0095435 | 9/2007 |

* cited by examiner

Primary Examiner — Gerald Gauthier
(74) Attorney, Agent, or Firm — H.C. Park & Associates, PLC

(57) ABSTRACT

A method for connecting a calling terminal to a called terminal includes establishing a first session to a video server and a call connection request to the called terminal, receiving ringback tone (RBT) video data from the video server using the established first session during a waiting time before a response from the called terminal for the request is received, generating a setup flag to set a connection environment with the called terminal to perform a fast setup between the calling terminal and the called terminal, and transmitting the generated setup flag to the called terminal through a second session established by the called terminal. A system to perform the method includes an establishing unit to establish the first session, an RBT video data receiving unit to receive the RBT video data, a setup flag generating unit, and a setup flag transmitting unit.

20 Claims, 7 Drawing Sheets

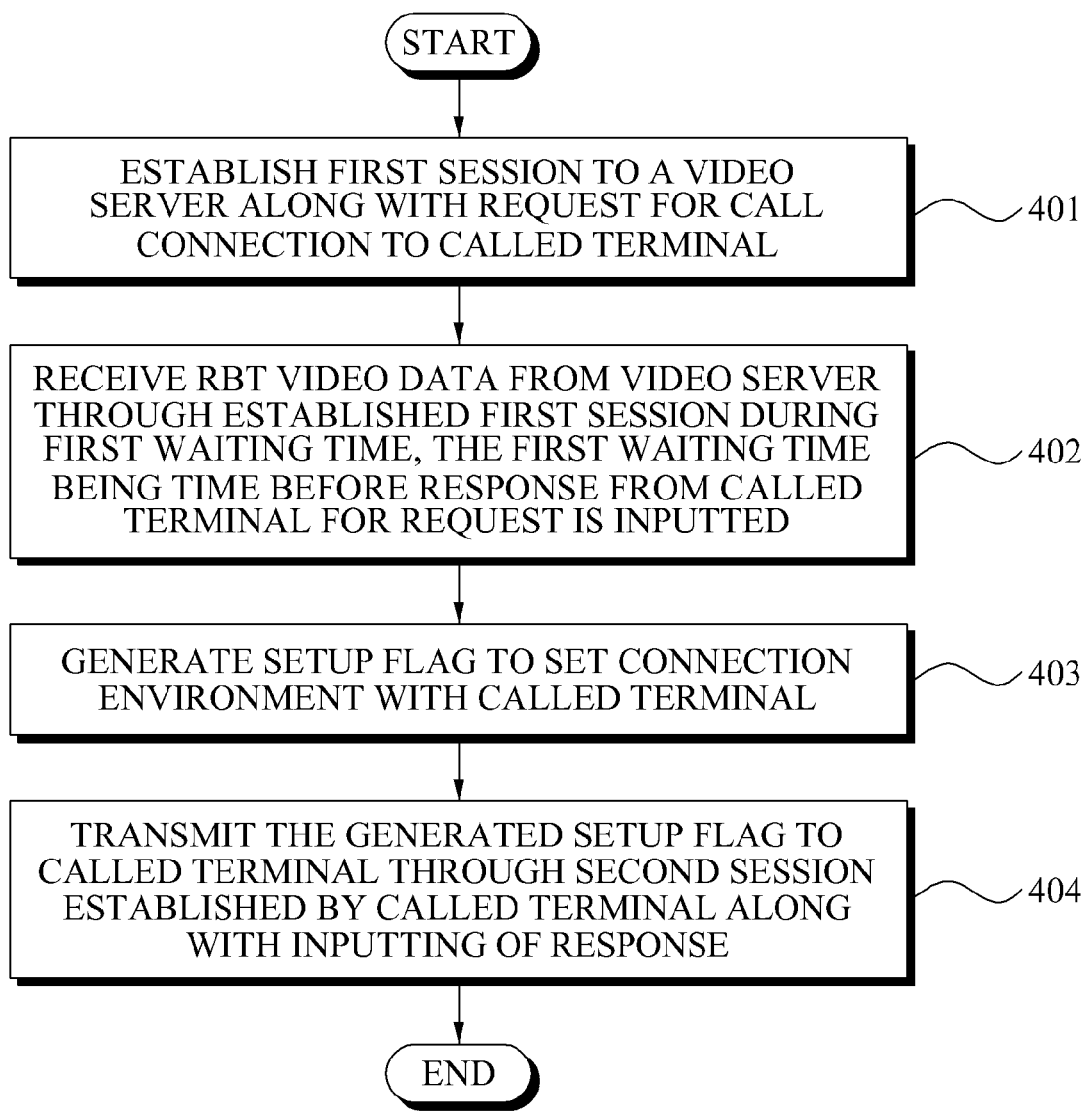

METHOD AND SYSTEM FOR ESTABLISHING CONNECTION TO CALLED TERMINAL

CROSS-REFERENCE TO RELATED APPLICATION

This application claims priority from and the benefit of Korean Patent Application No. 10-2008-0020451, filed on Mar. 5, 2008, which is hereby incorporated by reference for all purposes as if fully set forth herein.

BACKGROUND OF THE INVENTION

1. Field of the Invention

The present invention relates to a method and system for connecting a calling terminal with a called terminal after the calling terminal is first connected with a video server, and more specifically, a method and system for connecting a calling terminal with a called terminal after the calling terminal is first connected with a video server, whereby there is a greater chance of establishing the connection with the called terminal using a procedure for faster connection setup.

2. Discussion of the Background

While waiting for a called terminal to respond to a calling terminal's communication connection request, the calling terminal may be connected to a ringback tone (RBT) server so the calling terminal's user may receive information, such as voice, music, or video service, during a waiting time.

Once the called terminal responds to the communication connection request, the calling terminal may be disconnected from the RBT server. Then, the calling terminal performs a communication connection with the called terminal.

In this instance, the communication connection setup between the calling terminal and called terminal is established. While a normal communication connection setup may be performed conventionally, there are also methods whereby the communication connection setup between a calling terminal and a called terminal may be performed faster, by using for example a Qualcomm Fast Setup or a fast setup method registered under the mark, Qchat®. Throughout this application, the term "fast setup" shall refer to a setup method that results in a communication connection setup in less time than a normal communication connection setup.

However, once the calling terminal is connected to the RBT server, a certain minimum time may pass before the calling terminal completes disconnection from the RBT server and connects to the called terminal. Therefore, the calling terminal may continuously generate data (e.g. stuffing data) for communication with the RBT server during this time even after the called terminal responds to the calling terminal's communication connection request.

Because of this delay time, the called terminal may connect as one-sided communication with a calling terminal that has yet to complete a communication connection with the called terminal, and the called terminal may receive the stuffing data that the calling terminal intends to transmit to the RBT server.

In this instance, the called terminal may perform a normal communication connection setup according to the reception of the stuffing data. This may occur if the called terminal receives the stuffing data from the calling terminal before receiving a flag for fast setup. In this case, the called terminal may mistake the connection environment for the normal setup instead of the fast setup.

That is, even if the calling terminal intends to send a flag for fast setup to the called terminal, the called terminal may receive the stuffing data first, and the normal setup may be performed between the calling terminal and called terminal instead of the fast setup.

SUMMARY OF THE INVENTION

This invention provides a method for connecting a calling terminal with a called terminal after the calling terminal is first connected with a video server, whereby there is a greater chance of establishing the connection with the called terminal using a faster connection setup procedure.

This invention also provides a system that can connect a calling terminal with a called terminal after the calling terminal is first connected with a video server, whereby there is a greater chance of establishing the connection with the called terminal using a faster connection setup procedure.

Additional features of the invention will be set forth in the description which follows, and in part will be apparent from the description, or may be learned by practice of the invention.

This invention discloses a method for connecting a calling terminal to a called terminal, including: establishing a first session to a video server and a call connection request to the called terminal, receiving ringback tone (RBT) video data from the video server using the first session to the video server during a first waiting time, the first waiting time being a time before a response from the called terminal for the call connection request is inputted, generating a setup flag to set a connection environment with the called terminal to perform fast setup between the calling terminal and the called terminal, and transmitting the setup flag to the called terminal through a second session established by the called terminal.

This invention also discloses a system for connecting a calling terminal to a called terminal including a session establishing unit to establish a first session to a video server and a call connection request to the called terminal, an RBT video data receiving unit to receive RBT video data from the video server using the first session to the video server during a first waiting time, the first waiting time being a time before a response from the called terminal for the request is inputted, a setup flag generating unit to generate a setup flag to set a connection environment with the called terminal to perform a fast setup between the calling terminal and the called terminal, and a setup flag transmitting unit to transmit the setup flag to the called terminal through a second session established by the called terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a flowchart illustrating a method for connecting a calling terminal to a called terminal according to an exemplary embodiment of the present invention.

DETAILED DESCRIPTION OF THE ILLUSTRATED EMBODIMENTS

Figure 1:
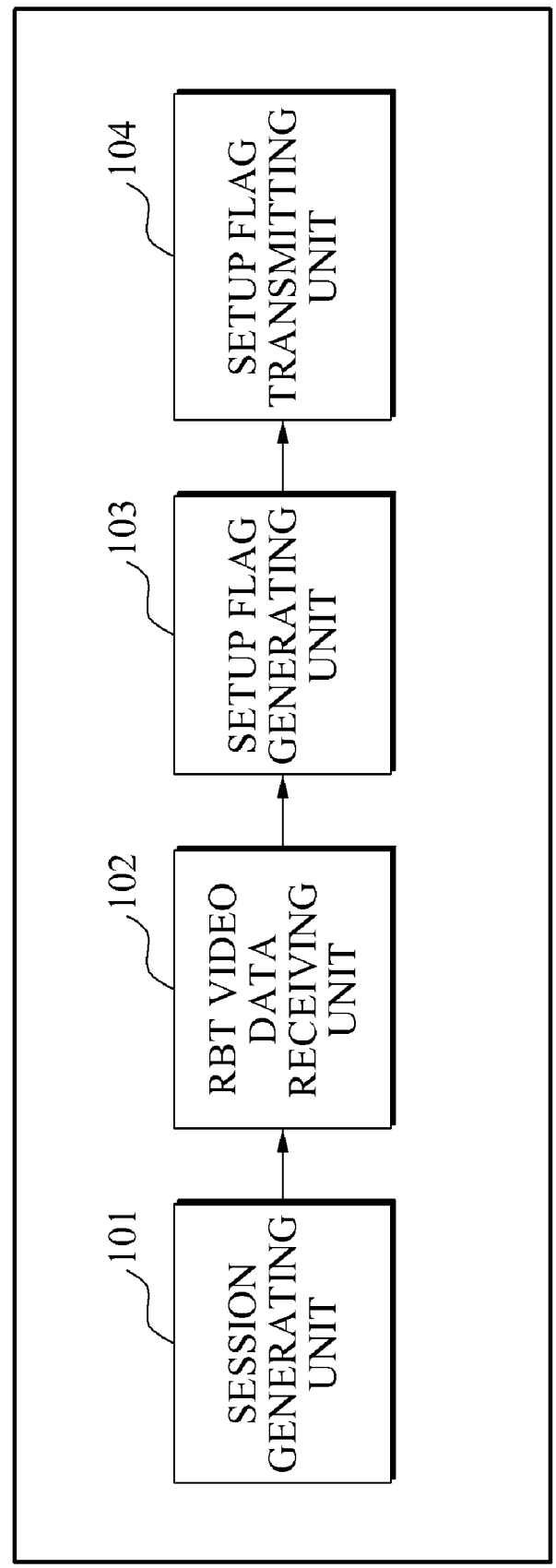
FIG. 1 is a block diagram illustrating a connection performance improvement system according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

When an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Hereinafter, a method and system for connecting a calling terminal to a called terminal will be described in detail referring to drawings.

For convenience of description, a system for connecting a calling terminal to a called terminal may be included in a calling terminal that requests a call connection.

Also, a "first session" as described below may be a connection route established by the calling terminal. Examples may include "a first session to the video server" as a connection route with the video server and "a first session to the called terminal" as a connection route with the called terminal, and the like.

Also, a "second session" may be a connection route established by other terminals (e.g. a video server, or a called terminal) that communicate with the calling terminal and may be established in a different time from the time that the first session is established. For example, with respect to a calling terminal connected with the video server, the second session to a called terminal may be established earlier than the first session to a called terminal.

A communication connection of a channel between both parties (calling terminal vs. video server/called terminal) may be completed, the channel being where both the first session and the second session are established.

FIG. 1 is a block diagram illustrating a connection performance improvement system according to an exemplary embodiment of the present invention.

Referring to FIG. 1, a connection performance improvement system 100 may include a session generating unit 101, ringback tone (RBT) video data receiving unit 102, setup flag generating unit 103, and setup flag transmitting unit 104.

The session generating unit 101 may establish a first session from the calling terminal to a video server and a call connection request to a called terminal. That is, the session generating unit 101 performs a communication connection with the video server providing an RBT video data if, after a call connection request to the called terminal is generated, there is no response from the called terminal. In this instance, the video server may establish a second session to a calling terminal in response to establishing the first session and complete establishment of a channel with the calling terminal.

The RBT video data receiving unit 102 may receive RBT video data from the video server using the established first session during a first waiting time. The first waiting time may extend from the time that the first session is established until a response from the called terminal for the request is received by the calling terminal. That is, the RBT video data receiving unit 102 may receive RBT video data with respect to a voice or video service from the established first session and second session during the first waiting time.

The setup flag generating unit 103 may generate a setup flag for setting a connection environment with the called terminal. That is, the setup flag generating unit 103 may generate in advance the setup flag to indicate fast setup before connecting with a called terminal, thereby pre-arranging an environment where a fast connection is possible once a connection with the called terminal is performed.

The setup flag generating unit 103 may generate a setup flag based on a stuffing data generation period, the stuffing data being transmitted to the video server through the first session with the video server. That is, the setup flag generating unit 103 may periodically generate the setup flag. For example, the setup flag may be generated once a period, during which period the stuffing data is generated five times.

According to another exemplary embodiment, the setup flag generating unit 103 may generate the setup flag along with the generation of the stuffing data transmitted to the video server through the first session with the video server. That is, the setup flag generating unit 103 may simultaneously generate the setup flag and the stuffing data.

The setup flag transmitting unit 104 may transmit the generated setup flag to the called terminal through a second session established by the called terminal upon responding to the call connection request from the calling terminal. That is, the setup flag transmitting unit 104 may transmit the previously generated setup flag to the called terminal through the second session, thereby increasing the chance for the called terminal to perform the fast setup when a response to the communication connection request from the called terminal is inputted.

Specifically, the setup flag transmitting unit 104 may cancel the first session to the video server and transmit the setup flag for fast setup during a second waiting time, the second waiting time being a time before the first session to the called terminal is established corresponding to the established second session. That is, the setup flag transmitting unit 104 may transmit the previously generated setup flag through the second session together with the stuffing data or prior to the stuffing data even before the first session to the called terminal is established, and thereby can increase the chance that the called terminal will perform the fast setup instead of a normal setup.

Also, according to another exemplary embodiment, the setup flag transmitting unit 104 may transmit the generated setup flag to the video server through the first session while the established first session is maintained. That is, the setup flag transmitting unit may transmit the setup flag through the first session along with generation of the setup flag, and thereby can prepare to transmit the setup flag in real time to the called terminal when the first session changes its target of a connection from the video server to the called terminal without a waiting time (the second waiting time).

Hereinafter, exemplary embodiments with respect to a connection performance improvement system will be described with reference to FIG. 2 and FIG. 3.

As described above, there is a problem of an existing fast setup algorithm, and a session may be established between a calling terminal and a called terminal using a fast setup in a H.324M-compatible video telephone terminal. Specifically, a data value exchanged with a video server such as stuffing data, level detection, and the like may be transmitted to a called terminal, and the called terminal may fail to perform a fast setup and instead performs a normal connection after the calling terminal first establishes a first session to a video server to receive RBT video data.

An exemplary embodiment provides a method for performing a fast setup between two mobile terminals, wherein the two terminals omit data transmission of Terminal Capability Set (TCS) and Master Slave Determination (MSD) and perform a mutually engaged fast connection after a first terminal connects with the video server under a condition of a signal distortion and signal delay between mobile terminals compatible with the H.324M standard.

Figure 2:
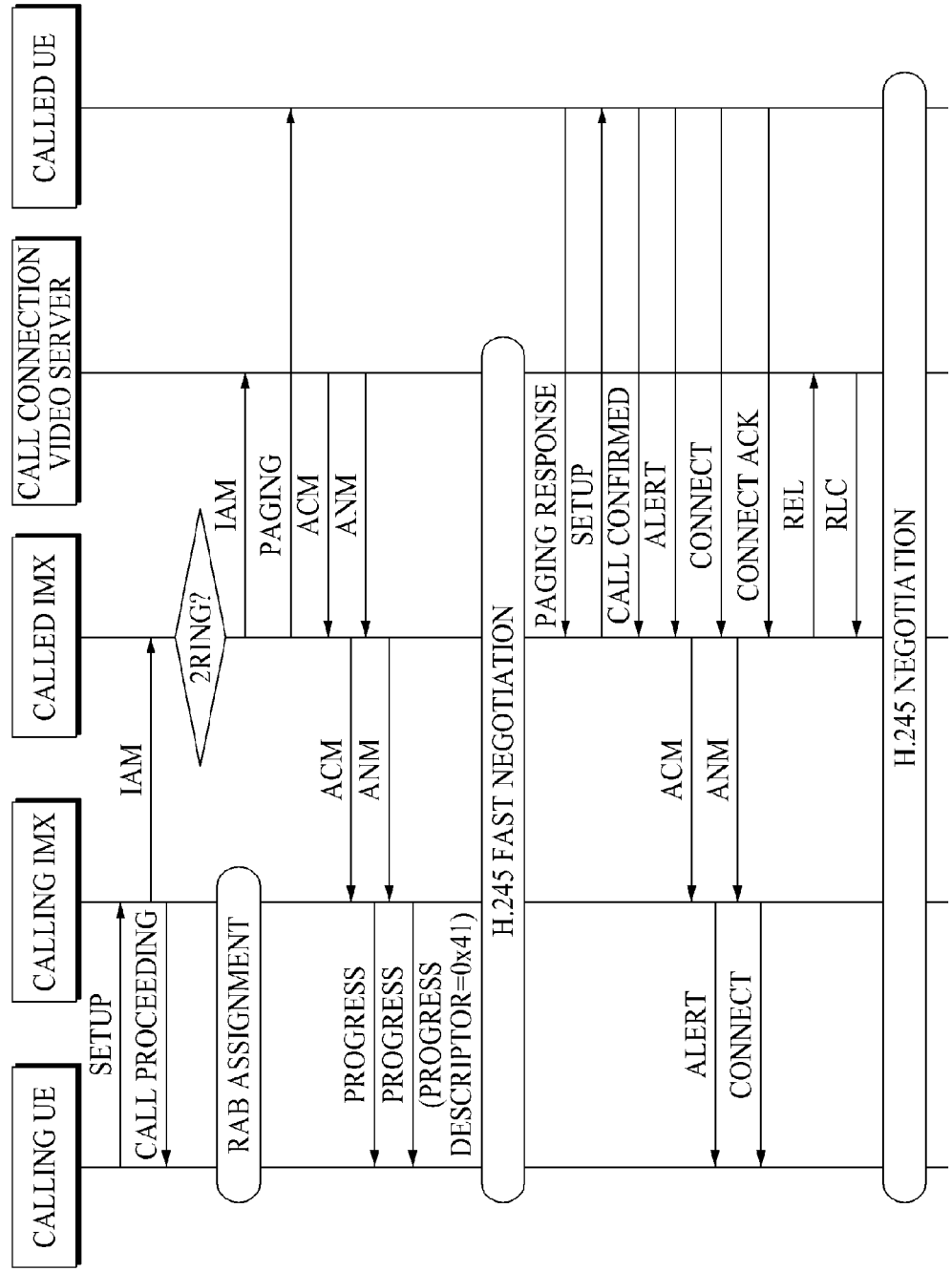
FIG. 2 illustrates a connection sequence of a video server providing ringback tone (RBT) video data.

FIG. 2 illustrates a connection sequence of a video server providing a RBT video data.

FIG. 2 is a message sequence chart illustrating setup processing between a calling terminal and a called terminal when the called terminal responds after a calling terminal connects with the video server. The video server may be VideoRing-ToYou, MTRU/3GIP, and the like. As illustrated in FIG. 2, before substantially performing a communication connection with the called terminal, the calling terminal first performs a first H.245 negotiation with the video server to establish the first session to the video server and then performs a second H.245 negotiation with the called terminal to establish a first session to the called terminal. The first H.245 negotiation is performed after a series of message between the calling terminal, also referred to as the calling user equipment (UE), a calling Internet Protocol Multimedia Exchange (IMX), a called IMX, and the call connection video server. As shown on FIG. 2, the messages include a Setup, an Initial Address Message (IAM), an Address Complete Message (ACM), and an Answer Message (ANM).

An outline of the service is as follow. When a calling terminal attempts a video telephone connection with a called terminal of the same communication carrier, the calling terminal receives a specific call indication (such as Progress Desc 0x41) from a network and establishes an H.324 session in a form of an H.245 Fast Negotiation using the received call indication before connecting with the called terminal.

Also, the calling terminal may receive an RBT video in a form of video telephony call from the video server through the established H.324 session and display the RBT video to a calling user. Subsequently, when the calling terminal receives a connect message from the called terminal, the calling terminal terminates the H.324 session with the existing video server and performs a new H.245 Negotiation to establish the H.324 session with the called terminal, thereby communicating with the called terminal.

In the H.324 session with the called terminal, since QVP_APP_WAIT_FOR_LEVEL_DETECTION_DONE uses QVP_H324_FAST_SETUP instead of an existing TCS transmitter and CAPABILITY EXCHANGE unit, the calling terminal receives a setup flag in level detection processing to perform a fast setup.

When the called terminal responds, a switchboard of a calling side may switch a call channel connected with the existing video server to connect with a switchboard of a called side.

This operation is performed after the called side responds, but the calling terminal may not close the H.324 session connected with the video server and establish a H.324 session with the called terminal until some minimum time has passed.

During this minimum time, since the called terminal is already prepared to open a session with the calling terminal, the called terminal receives a message and stuffing data (E1 4D 00 00 00) as padding data that the calling terminal intends to exchange with the existing video server, the message being transmitted by the calling terminal since the session with the existing video server has not yet terminated.

The received stuffing data (E1 4D 00 00 00) is not data for an initial session connection, namely, a level detection, and since the called terminal cannot recognize the above fact, the called terminal may perform level detection and subsequently fast setup detection using the stuffing data. In this operation, the called terminal may miss a fast setup message and proceed with a normal setup.

Data that the called terminal receives after connecting with the video server may only include normal stuffing data and data that the calling terminal exchanges with the session of the existing video server.

When the called terminal performs level detection using the above data, the called terminal may find a pattern (about five bytes) of a specific flag related to the fast setup during a certain period time. However, the calling terminal may not transmit the fast setup flag since the fast setup flag is set to be transmitted when a new session is open, and thus the called terminal may recognize a connection as a normal setup.

A connection performance improvement system according to an exemplary embodiment of the present invention may transmit a previously generated setup flag from the calling terminal through a second session established with the called terminal, even before a first session to the called terminal is established, and thereby can lead the called terminal to more accurately perform the fast setup instead of a normal setup.

Figure 3:
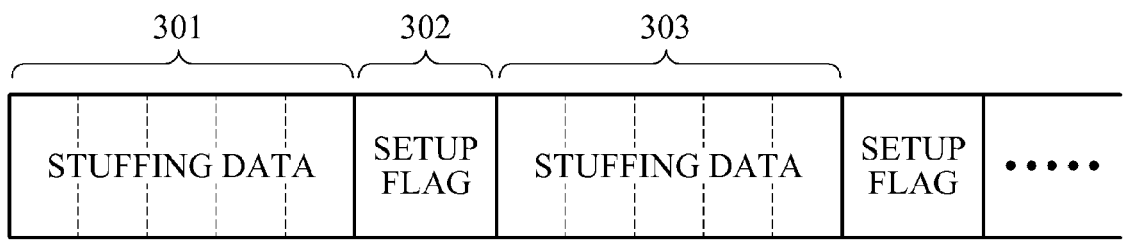
FIG. 3 illustrates setup data arranged with stuffing data according to an exemplary embodiment of the present invention.

FIG. 3 illustrates setup data arranged with stuffing data according to an exemplary embodiment of the present invention.

A connection performance improvement system 100 may transmit, to a video server, a previously generated setup flag for fast setup periodically or may transmit the same together with stuffing data through a first session, while an established first session is maintained.

Referring to FIG. 3, the connection performance improvement system 100 may insert a setup flag 302 between stuffing data 301 and 303 transmitted to the video server and transmit the setup flag 302 while the established first session is maintained.

That is, when a calling side connects with the video server, since reducing time for session recreation is limited, the connection performance improvement system 100 may periodically transmit stuffing data (E1 4D 00 00 00) in a scheme of transmitting stuffing data 301 five times and a setup flag 302 for fast setup once. Accordingly, a called terminal may receive the fast setup flag during the setup processing, and thereby can perform faster connection.

As another example, the connection performance improvement system 100 may transmit the setup flag 302 to the video server along with transmitting stuffing data 301 to the video server. Based on the above, the called terminal may lead the calling terminal to receive the setup flag 302 for the fast setup together with the stuffing data 301 that the calling terminal transmits under connection with an existing session, until the calling side connects with a new session.

Therefore, the connection performance improvement system 100 may permit the called terminal to perform fast setup even though messages including stuffing data 301 and the like used for transmission to the video server are transmitted through a second session established with a called terminal.

FIG. 4 is a flowchart illustrating a method for connecting a calling terminal to a called terminal according to an exemplary embodiment of the present invention.

In operation 401, the connection performance improvement system 100 may establish a first session to a video server and a call connection request to a called terminal. Thus, although the call connection request to a called terminal is generated, a session generating unit 101 also generates the first session to the video server if the called terminal does not respond quickly enough.

In operation 402, the connection performance improvement system 100 receives RBT video data from the video server through the established first session during a first waiting time. The first waiting time occurs before a response to the call connection request is inputted from the called terminal. That is, an RBT video data receiving unit receives the RBT video data, namely, data including audio, such as voice or music, and/or video service from the video server through the established first session during the first waiting time after the call connection request is generated but before a response to the request is inputted from the called terminal.

In operation S403, the connection performance improvement system 100 generates a setup flag to set a connection environment with the called terminal. That is, the setup flag generating unit 103 previously generates the setup flag for fast setup before connecting with a called terminal, thereby pre-arranging an environment where a fast connection is possible.

Also, the connection performance improvement system 100 in operation 403 may include generating the setup flag based on a stuffing data generation period, the stuffing data being transmitted to the video server through the first session. That is, the connection performance improvement system 100 may periodically generate the setup flag. For example, the setup flag may be generated once during a period in which the stuffing data is generated more than once, such as five times.

Also, the connection performance improvement system 100 in operation 403 may include generating the setup flag along with a generation of the stuffing data transmitted to the video server through the first session to the video server. That is, the connection performance improvement system 100 may generate the setup flag and the stuffing data together.

In operation 404, the connection performance improvement system 100 may transmit the generated setup flag to the called terminal through a second session established by the called terminal along with the inputting of the response. That is, when the called terminal's response is received, the setup flag transmitting unit 104 transmits the generated setup flag to the called terminal through the second session to perform the fast setup.

Also, the connection performance improvement system 100 in operation 404 may cancel the first session to the video server and transmit the setup flag during a second waiting time. The second waiting time may be a time before the first session to the called terminal is established. That is, the setup flag transmitting unit 104 may transmit the previously generated setup flag through the second session with the called terminal together with the stuffing data or prior to the stuffing data, even before the first session to the called terminal is established. This can lead the called terminal to more accurately perform the fast setup rather than a normal setup.

Also, the setup flag transmitting unit 104 in operation 404 may transmit the generated setup flag to the video server through the first session while the established first session is maintained. That is, the setup flag transmitting unit 104 may transmit the setup flag through the first session along with generation of the setup flag, and thereby can prepare to transmit the setup flag in real time to the called terminal when the first session changes its target of a connection from the video server to the called terminal without a waiting time (the second waiting time).

According to the exemplary embodiments, a method and system are provided to connect a calling terminal with a called terminal using a fast setup after the calling terminal is connected with a video server (e.g. RBT video server) providing RBT video data. The fast setup permits faster connection setup with the called terminal, thereby improving performance of a connection to a called terminal.

Further, a setup flag for the fast setup with a called terminal is generated while connecting with a video server providing an RBT video data, and the setup flag is transmitted to the called terminal even if the called terminal performs one-sided connection with a calling terminal that is not ready for the connection, and thus the called terminal may more accurately perform the fast step instead of a normal setup.

Figure 5A:
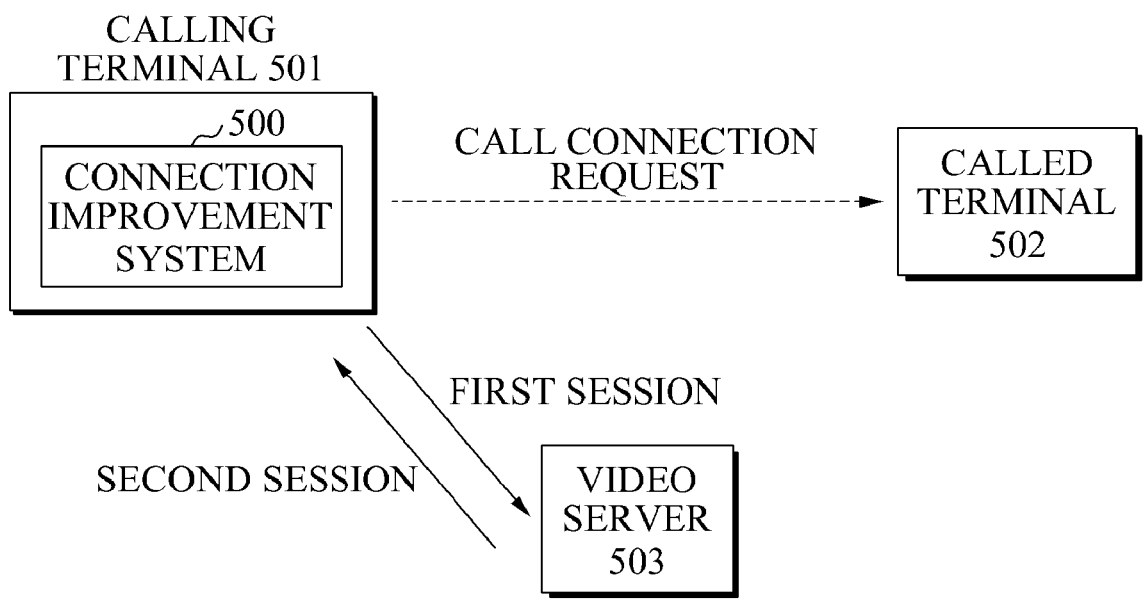
FIG. 5A, FIG. 5B, and FIG. 5C are conceptual diagrams illustrating a system for connecting a calling terminal to a called terminal according to an exemplary embodiment of the present invention.
Figure 5B:
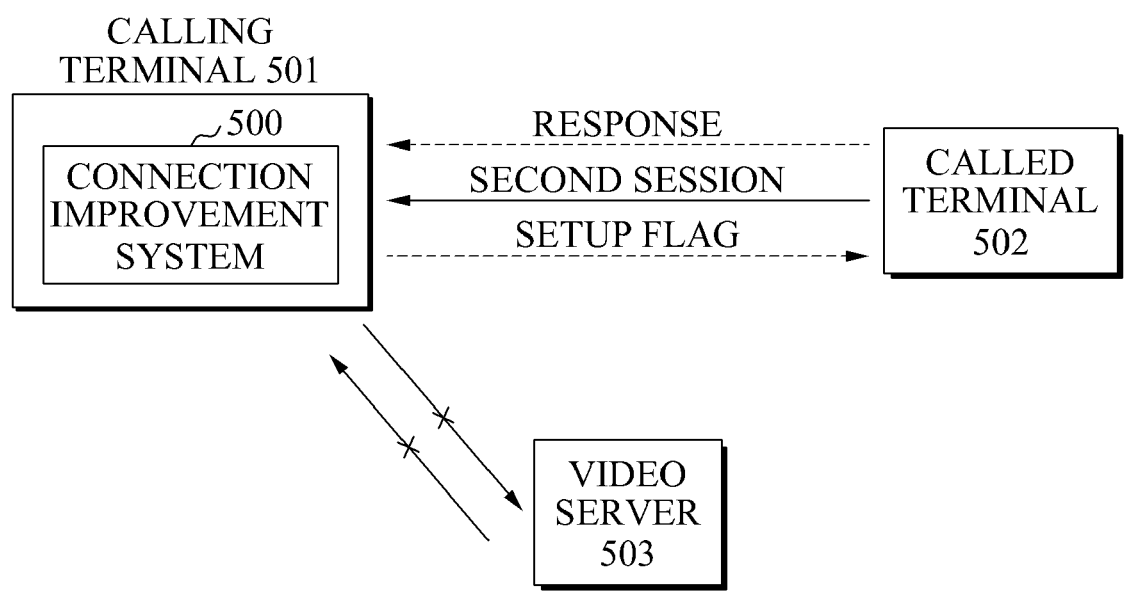
Figure 5C:
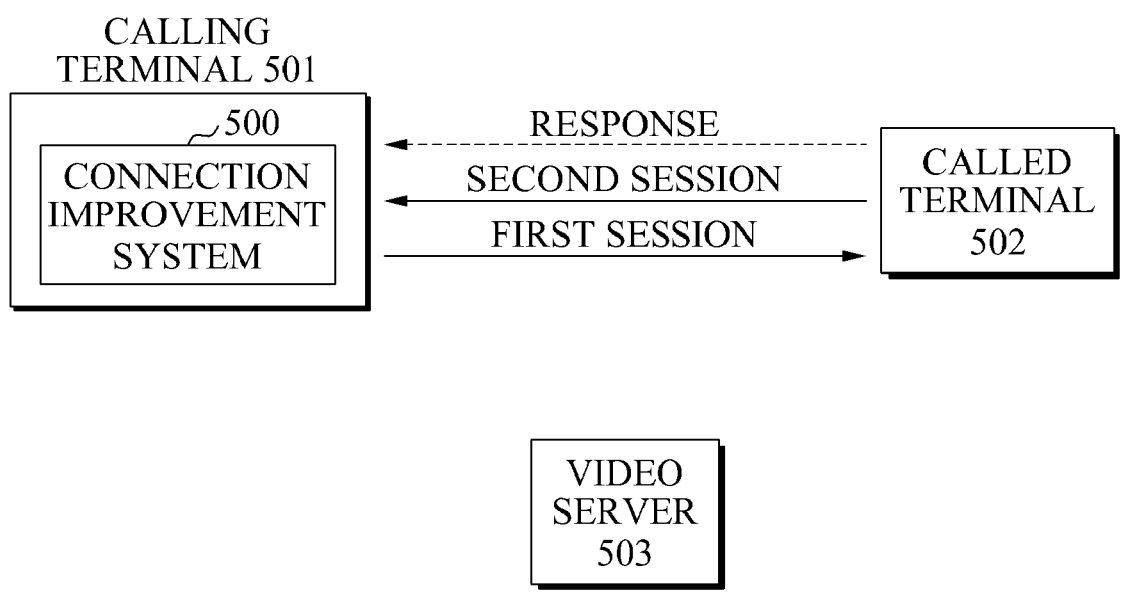

FIG. 5A, FIG. 5B, and FIG. 5C are conceptual diagrams illustrating a system for connecting a calling terminal to a called terminal according to an exemplary embodiment of the present invention.

In FIG. 5A, a calling terminal 501 including a connection improvement system 500 may transmit a call connection request to a called terminal 502 and establish a first session to a video server 503 if the called terminal 502 does not quickly respond to the call connection request. Also, the video server 503 may establish a second session to the calling terminal 501 corresponding to the first session.

Therefore, a channel between the calling terminal 501 and the video server 503 is completed. The connection improvement system 500 may receive RBT video data such as voice or video service data and the like from the video server 503, and may transmit padding data such as stuffing data and the like to the video server 503.

The channel between the calling terminal 501 and the video server 503 is completed during a first waiting time before the called terminal 502 responds to the call connection request and the connection improvement system 500 may generate a setup flag to set a connection environment to the called terminal 502.

When the called terminal 502 responds to the call connection request as illustrated in FIG. 5B, the calling terminal 501 including the connection improvement system 500 may close the first session to the video server 503 and prepare to open a first session to the called terminal 502. However, the calling terminal 501 and called terminal 502 are connected with each other through a second session that is established by the called terminal 502 according to the response.

The connection improvement system 500 may transmit a previously generated setup flag to the called terminal 502 through the second session.

Specifically, the connection improvement system 500 may cancel the first session to the video server 503 and transmit the setup flag during a second waiting time before the first session to the called terminal 502 is established, using the established second session.

Therefore, in the connection improvement system 500, a message including stuffing data to be transmitted from the calling terminal 501 to the video server 503 is instead transmitted to the called terminal 502, and a setup flag for fast setup is transmitted to the called terminal 502, and thus the called terminal 502 may receive the setup flag and perform the fast setup with the calling terminal.

FIG. 5C illustrates establishment of the first session from the calling terminal 501 to the called terminal 502 and completing the channel between the calling terminal 501 and the called terminal 502 under fast setup.

According to the exemplary embodiments, connection performance may be improved through performing the fast setup that enables faster connection setup with the called terminal, when the calling terminal connects with a called terminal after connecting with a video RBT server.

Also, according to the exemplary embodiments, when the calling terminal connects with the called terminal after connecting with the video RBT server, the system may perform the fast setup that enables faster connection setup with the called terminal to reduce waiting time of the calling terminal, thereby improving a calling user's satisfaction.

According to the exemplary embodiments, a method and system can perform a fast setup with a higher probability of being set when connecting with a called terminal after connecting with a video server providing RBT video data, the fast setup permitting faster connection setup with the called terminal, thereby improving performance of a connection to a called terminal.

According to the exemplary embodiments of the present invention, a method and apparatus can generate in advance a setup flag for fast setup with a called terminal while connecting with a video server providing a RBT video data, transmit the setup flag generated in advance to the called terminal even when the called terminal performs a one-sided connection with a calling terminal that is not ready for the connection, and thus the called terminal accurately performs the fast setup instead of a normal setup, thereby improving performance of a connection to a called terminal.

The exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of exemplary embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for connecting a calling terminal to a called terminal, comprising:
    establishing a first session to a video server and a call connection request to the called terminal;
    receiving ringback tone (RBT) video data from the video server using the first session to the video server during a first waiting time, the first waiting time being a time before a response from the called terminal for establishing a second session is received in response to the call connection request;
    generating a setup flag to set a connection environment with the called terminal to perform a fast setup between the calling terminal and the called terminal; and
    transmitting the setup flag to the called terminal through the second session established by the called terminal.

2. The method of claim 1, wherein transmitting the setup flag to the called terminal comprises:
    transmitting the setup flag during a second waiting time, the second time being a time before a first session to the called terminal is established.

3. The method of claim 1, wherein generating the setup flag comprises:
    generating the setup flag based on a generation period of stuffing data, the stuffing data being transmitted to the video server through the first session to the video server.

4. The method of claim 1, wherein generating the setup flag comprises:
    generating stuffing data along with generating the setup flag to be transmitted to the video server through the first session to the video server.

5. The method of claim 1, further comprising:
    transmitting, to the video server, the setup flag through the first session to the video server while the first session to the video server is maintained.

6. The method of claim 1, further comprising:
    canceling the first session to the video server;
    performing the fast setup between the calling terminal and the called terminal after transmitting the setup flag to the called terminal through the second session; and
    establishing a first session to the called terminal.

7. A computer readable medium recording a program to implement the method of claim 1.

8. A computer comprising a memory and a processor, the computer to read from the memory or a readable medium a program to implement the method of claim 1.

9. The method of claim 1, wherein the setup flag is arranged between first stuffing data and second stuffing data.

10. The method of claim 1, further comprising:
    transmitting, to the video server, the setup flag through the first session to the video server before receiving the response from the called terminal for establishing the second session, the setup flag being transmitted periodically.

11. The method of claim 10, further comprising:
    switching the transmission of the setup flag to the called terminal if the second session is established by the called terminal.

12. A system for connecting a calling terminal to a called terminal, comprising:
    a session establishing unit to establish a first session to a video server and a call connection request to the called terminal;

a ringback tone (RBT) video data receiving unit to receive RBT video data from the video server using the first session to the video server during a first waiting time, the first waiting time being a time before a response from the called terminal for establishing a second session is received in response to the call connection request;

a setup flag generating unit to generate a setup flag to set a connection environment with the called terminal to perform a fast setup between the calling terminal and the called terminal; and a setup flag transmitting unit to transmit the setup flag to the called terminal through the second session established by the called terminal.

13. The system of claim 12, wherein the setup flag transmitting unit transmits the setup flag during a second waiting time, the second waiting time being a time before a first session to the called terminal is established.

14. The system of claim 12, wherein the setup flag generating unit generates the setup flag based on a generation period of stuffing data, the stuffing data being transmitted to the video server through the first session to the video server.

15. The system of claim 12, wherein the setup flag generating unit generates the setup flag along with generating stuffing data to be transmitted to the video server through the established first session.

16. The system of claim 12, wherein the setup flag transmitting unit transmits the setup flag to the video server through the first session to the video server while the established first session to the video server is maintained.

17. The system of claim 12, wherein the fast setup is performed after the setup flag is transmitted to the called terminal through the second session.

18. The system of claim 12, wherein the setup flag is arranged between first stuffing data and second stuffing data.

19. The system of claim 12, further comprising:

transmitting, to the video server, the setup flag through the first session to the video server before receiving the response from the called terminal for establishing the second session, the setup flag being transmitted periodically.

20. The system of claim 19, further comprising:

switching the transmission of the setup flag to the called terminal if the second session is established by the called terminal.

* * * * *